F. L. SESSIONS.
LOCOMOTIVE.
APPLICATION FILED JAN. 9, 1905. RENEWED OCT. 16, 1909.
1,027,075.
Patented May 21, 1912.
3 SHEETS—SHEET 1.
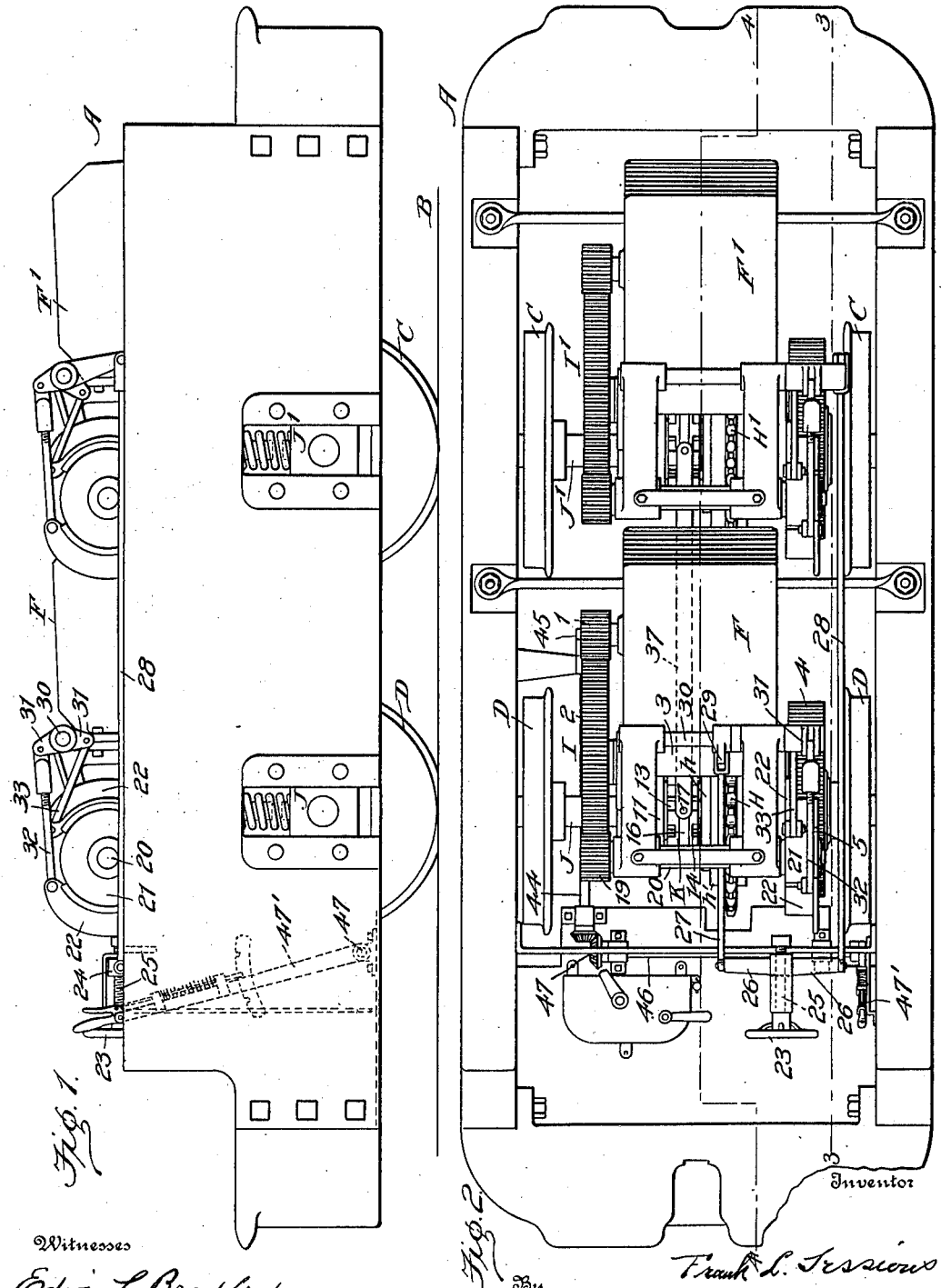
Witnesses
Edwin L. Bradford
Auguste J. Lix
Inventor
Frank L. Sessions
H. H. Bliss
Attorney
By

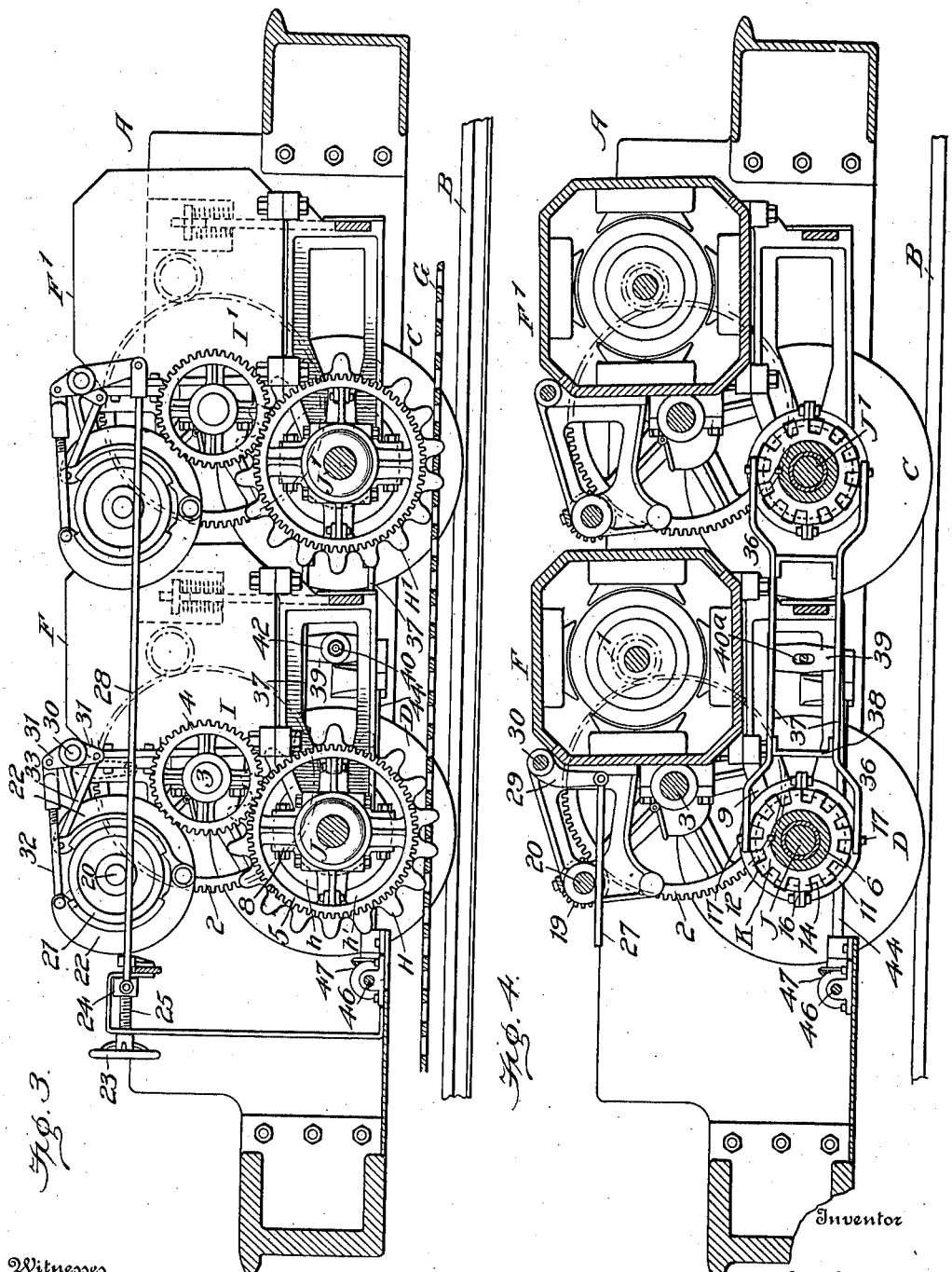

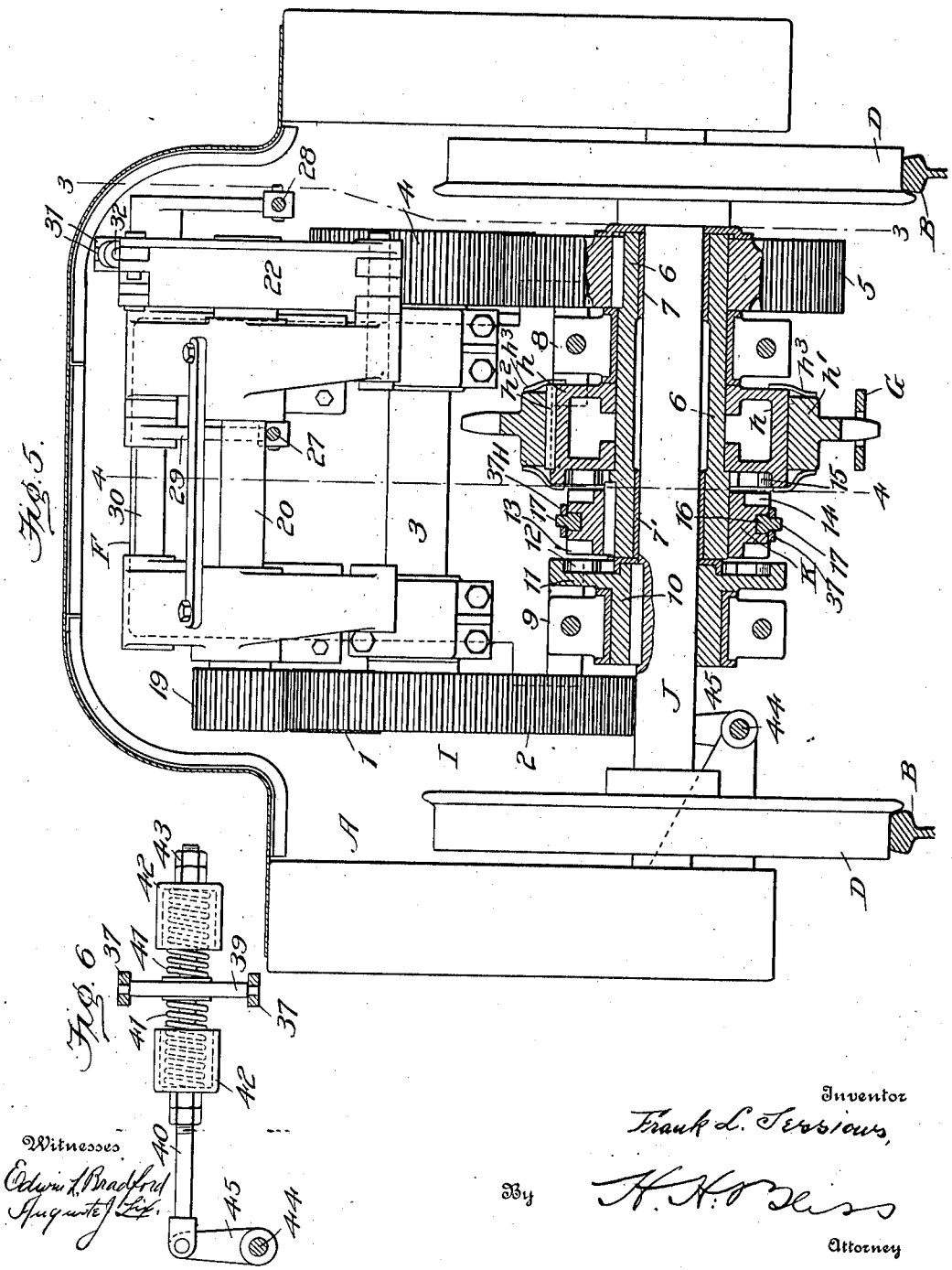

UNITED STATES PATENT OFFICE.

FRANK L. SESSIONS, OF COLUMBUS, OHIO, ASSIGNOR, BY MESNE ASSIGNMENTS, TO THE JEFFREY MANUFACTURING COMPANY, A CORPORATION OF OHIO.

LOCOMOTIVE.

1,027,075. Specification of Letters Patent. Patented May 21, 1912.

Application filed January 9, 1905, Serial No. 240,342. Renewed October 16, 1909. Serial No. 523,053.

*To all whom it may concern:*

Be it known that I, FRANK L. SESSIONS, a citizen of the United States, residing at Columbus, in the county of Franklin and State of Ohio, have invented certain new and useful Improvements in Locomotives, of which the following is a specification, reference being had therein to the accompanying drawing.

This invention relates to improvements in locomotives, pertaining more particularly to locomotives of the class which can be used either in the ordinary way, that is, in such a way as to depend upon the track wheels and their frictional engagement with the tracks for purposes of propulsion, or can be used in connection with a rack rail with which they are adapted to engage by means of one or more toothed wheels carried by the locomotive.

Figure 1 is a side elevation of a locomotive embodying my improvements. Fig. 2 is a top plan view of the same. Fig. 3 is a section on the line 3—3 of Fig. 2. Fig. 4 is a section on the line 4—4 of Fig. 2. Fig. 5 is a vertical transverse section through one of the axles. Fig. 6 is a detail of the clutch shifting mechanism.

In the drawings A indicates as an entirety the body part or main frame of the machine; B, B the track rails on which the car is supported and moves; C, C the front track wheels or truck wheels; D, D the rear truck wheels; F, F' the motors; G a traction rack rail; H, H' traction gear wheels or sprocket wheels; I, I' the trains of gearing extending from the motors toward the axles J, J'. The track wheels or truck wheels C, D are rigidly secured to the axles J, J', respectively. The traction gear or sprocket wheels H, H' are mounted loosely in relation to the axles, one upon each. Inasmuch as the two motors and the two sets of devices driven thereby (including duplicates of the shafting, gearing and axles) are similar to each other, it is not necessary to describe both of them in detail, reference to one being sufficient.

The motor F is, through its pinion 1, connected to the gear wheel 2 on an intermediate counter-shaft 3, which on the opposite end carries the spur wheel 4, meshing with gear 5. The latter is keyed to a comparatively long sleeve or tubular shaft 6, which is mounted loosely upon the axle J, there being preferably bushings or wearing tubes as shown at 7'. One of the motor supporting frames, that at 8, is supported directly upon this sleeve or hollow shaft. The other motor supporting frame 9 rests upon a sleeve 10 which is keyed to the axle J and formed with a flange 11, having clutch teeth or cavities at 12 for a purpose to be described. It is upon the sleeve or hollow shaft 6 that the traction gear or sprocket wheel H is loosely mounted.

K is a clutch mounted upon the sleeve 6 in such way as to be adjustable longitudinally thereon and at the same time held so as to rotate therewith. Upon one side this part K has clutch teeth or cavities at 13 adapted to engage with counter parts at 12, and upon the other side it is similarly formed as shown at 14 to engage with teeth or clutch cavities at 15 on the face of the traction gear or sprocket wheel H. 16 is a clutch ring fitting in groove in clutch K, and 17 are trunnion pins. All of these parts it will be readily understood can be made in the ordinary way.

As above remarked, the motor or engine and parts connected thereto and driven thereby at the front end of the locomotive are the same as those at the rear end. The two sets of power devices and driving parts are entirely independent of each other.

I am aware that it has been heretofore proposed to employ locomotives of the same general class as that herein presented but having the two axles of the two trains of gear for the two motors so connected together as that the parts connected with one axle can be influenced by the parts connected with the other. But I have found that under many circumstances the connecting together of two axles or of the two sprocket wheels results in disadvantages of a serious natrue. It is practically impossible to maintain the rack rails in such condition that two rack wheels or sprocket wheels can synchronously operate therewith successfully, the pitch distances from any one aperture of the rack rail to those adjacent to it, or between any tooth of a rack and those adjacent to it, are so liable to variation from wear, and other causes, that superior results are attained if the two rack wheels are allowed to operate not synchronously but independelty of each other, so that each can have its own "tracking" possibilities and can adapt itself to any variations in the pitch distances of the sprocket elements along the rail. I employ also two independent braking mechanisms, one for each motor and gear train. The gear wheel 2 drives a pinion 19 on a shaft 20, which is suitably mounted in bearings on the motor arm or body. This shaft carries the brake drum 21, around which there is placed the sections of a friction brake 22, which are adapted to be clamped tightly against the drum. The brakes can be connected together by a common operating mechanism, as shown at 23, 24 and 25.

23 is a hand wheel within reach of the motorman. It is connected to a screw shaft 25 with which fits a nut 24. The nut carries two laterally extending arms 26. One of these is pivotally connected to a pitman or connecting rod 27, which at the opposite end is pivoted to a crank arm 29. The latter is secured to a rock shaft 30 mounted in suitable bearings, and carries a cross-head or two crank arms 31 which are connected by rods 32, 33, respectively, with the ends of the pivoted brake shoes 22. The other arm 26, carried by the nut 24, is connected by a rod or pitman 28 with a system of rods, crank arms and rock shafts similar to that above described and combined with the front motor F'. When the hand wheel 23 and shaft 25 are turned in the proper direction the draft exerted on the rods 27, 28, applies the brakes immediately to the drums 21.

By constructing and arranging the brake parts in the way described I can bring readily to a state of rest the entire train of gearing from the wheel at 2 downward to the axle, and also the motor armature, all of these parts tending to revolve after the power is shut off because of their inertia.

I have shown a form of mechanism for actuating the clutches, such as I at present prefer. The trunnion pins 17, above referred to, on the clutch ring 16 are fitted in apertures in a frame which extends from the clutch on the rear axle to that on the front one. This frame as shown comprises longitudinally arranged bars 37 which are forked or made to diverge, if necessary, as shown at 36, and connected together by cross bars 38. The frame thus provided can be moved bodily longitudinally of the axles. To effect this movement I employ a rod 40 which engages with a vertical cross bar 39 on the frame. The cross bar has an aperture $40^a$ through which the rod passes loosely. That the engagement may be of yielding character I interpose springs 41 between the rod and the clutch shifter. These spring abut against the cross bar 39 and against socket pieces or cups 42, the latter being adjustable along the rod so as to vary the tension under which the springs act in maintaining the engagement of the parts. The rod 40 is actuated by a rock shaft 44, the latter carrying a crank 45 pivoted to the rod. The shaft 44 in turn receives motion from a cross shaft 46, the two shafts being connected preferably by bevel gearing at 47. The operator effects the rocking of these shafts 46 and 44, and through them the shifting of the clutch, by means of the hand lever 47'.

It was remarked above that the traction gear or sprocket wheels H, H' are normally loose in relation to the axles. They may be loose normally with respect to rotation with the axle, and held in fixed position longitudinally thereof, or they may be also loose longitudinally, that is to say adapted to slip or slide from one position to another along the axle. Under some circumstances I prefer to have this capability of sliding, and in order to provide this I form each traction gear or sprocket wheel in two parts. The inner or hub portion is indicated by $h$, this being the part formed with clutch teeth or cavities 15, and which is mounted upon the shaft in such way that either can turn freely in relation to the other, but is held against longitudinal movement by suitable shoulders or stops. The outer part of the traction gear consists of the ring-like part $h'$ which carries the rack teeth, and which is fitted snugly to the periphery of the hub part $h$. It can slide to a limited extent on the hub part, on lines parallel to the axis, but is held against rotation in relation thereto by the feather or spline $h^2$. The outer or sliding part $h'$ can be held in a normal central position in any suitable way, as for instance by springs $h^3$.

The manner of operating a locomotive constructed with the parts which I have described will be readily understood.

The track structure comprises rack rails only at places where there are grades steep enough to demand them. At other points the locomotive operates by friction traction in the ordinary way.

In starting the car and its train on a section of level track where there is no rack, the operator throws the clutch K into engagement with the clutch element at 11. Then the locomotive may be regarded as an ordinary electric vehicle, the power from the motor passing through the train of gearing and the wheel at 5 and thence through the sleeve 6 to the clutch K, and from that to the axle J through the sleeve 10 keyed thereto. When the vehicle approaches a grade where a rack section is present the clutch is thrown in the opposite direction so as to be disengaged from the sleeve 10 and the axle J and so as to engage with the sprocket wheel H through the teeth at 14 and 15. Thereafter the axle J of the wheels D, D, becomes entirely loose and disconnected from the power devices. The power is all imparted to the sprocket wheel and the latter by its engagement with the rack causes the propulsion, bodily, of the locomotive and its train. The sprocket wheel H is of a pitch diameter considerably less than the tread diameter of the main track wheels D and consequently moves with a different speed of rotation. No power is imparted to the axle J or the track wheels D from the driving devices, they being merely pushed along by the action of the sprocket wheel upon the rack. In fact, it will be seen that at no time in this mechanism are the track wheels and the rack gear wheel driven together.

It will be noted that the central clutch elements K are movable to any one of three positions. In Fig. 5 one of the clutch elements is shown in its central position disengaged from both the rack wheel element and the axle clutch element. Under certain conditions it may be desirable to in this way entirely disconnect the motors and brakes from the track and rack wheels, as for instance when two locomotives in tandem, after taking a load up a grade are descending light. In this case the braking effect of one of them is sufficient and the motor and brakes of the other can be disconnected to avoid wear.

What I claim is:—

1. The combination of the frame, the axles, the track wheels on the axles, a rack wheel or sprocket wheel loosely supported on the axle, the motor, the motor gearing, a continuously rotating clutch element driven by the gearing and adapted to engage with the sprocket wheel, and the clutch element connected to the axle and adapted to have the driving clutch element connected therewith when it is disconnected from the sprocket wheel, substantially as set forth.

2. The combination of the frame, the axles, the track wheels on the axles, the sprocket wheel or rack wheel, the motor, the intermediate shaft, gearing connecting the motor to the intermediate shaft, the driving clutch element, the gearing connecting the intermediate shaft to the driving clutch element, the clutch element connected to the sprocket wheel or rack wheel and adapted to be engaged by the driving clutch element, and the clutch element connected with the axle and adapted to be engaged by the driving clutch element when out of engagement with the rack wheel or sprocket wheel, substantially as set forth.

3. The combination of the frame, the axles, the track wheels rigidly secured to the axles, a rack wheel or sprocket wheel mounted loosely to revolve independently of the axles, a clutch element connected with the sprocket wheel or rack wheel, a clutch element connected with the axle, and a driving clutch element adapted to engage with either of the aforesaid clutch elements, said parts being constructed and arranged substantially as set forth whereby the rack wheel or sprocket wheel is disconnected from the power device when the axle clutch is engaged therewith, and the axle clutch is disconnected from the power device when the rack wheel is connected therewith, substantially as set forth.

4. The combination of the axles, the track wheels rigidly secured to the axles, the sleeve loose upon the axle, the sleeve rigid with the axle, the frame having one bearing on the loose sleeve and one bearing on the fixed sleeve, the rack wheel or sprocket wheel having a clutch element and mounted on the loose sleeve, the clutch element rigid with the fixed sleeve, the driving clutch element, the motor, the gearing between the motor and the driving clutch element, and means for shifting the driving element into engagement with the rack wheel or sprocket wheel and out of engagement with the clutch element fixed in the axle or vice versa, substantially as set forth.

5. The combination of the axle, the track wheels rigid with the axle, the sleeve loose on the axle, the sleeve rigid with the axle, the frame having a bearing on the loose sleeve and a second bearing on the fixed sleeve, the power gearing connected to the loose sleeve at points outside of the frame bearing, the rack wheel or sprocket mounted on the loose sleeve at a point inside of the frame bearing, the driving clutch element, the clutch element connected with the sprocket wheel or rack wheel, the clutch element connected to the axle and means for shifting the driving clutch element from the rack wheel or sprocket wheel to the clutch element fixed to the axle, substantially as set forth.

6. The combination of the axle, the track wheels rigid with the axle, the loose sleeve on the axle, the frame having one bearing on the loose sleeve, the gearing connected to and driving the sleeve, the driving clutch element slidably mounted on the loose sleeve, the clutch element connected rigidly with the axle, the rack wheel or sprocket wheel loose on the sleeve, and means for shifting the driving clutch element alternately into and out of engagement with the rack wheel or sprocket wheel and with the axle clutch element, substantially as set forth.

7. The combination of the axle, the track wheels rigid with the axle, the sleeve loosely mounted on the axle, the motor, the gearing interposed between the motor and the sleeve, the rack wheel or sprocket wheel mounted loosely on the sleeve, the clutch element connected to the axle, the clutch element connected to the rack wheel or sprocket wheel, the adjustable clutch element driven by the sleeve, and means for moving the adjustable clutch element into and out of engagement with the clutch element connected to the rack wheel and with the axle clutch element, substantially as set forth.

8. The combination in a locomotive, of the frame, the axles, the track wheels rigidly secured to the axles, the motor, the sleeve loose on one of said axles, the rack wheel loose on said sleeve, the gearing interposed between said motor and said sleeve, the clutch element carried by said rack wheel, the clutch element carried by said axle, and the driving clutch element carried by said sleeve and adjustable to engage with either of the aforesaid clutch elements.

9. In a locomotive, the combination of the frame, the axles, the track wheels on the axles, the rack wheel or sprocket free to rotate relative to said axle, the motor, the continuously rotating driving clutch element, the gearing interposed between said element and said motor, the clutch element connected with the said axle and adapted to be engaged by the driving clutch element, and the clutch element connected with the said sprocket wheel and adapted to be engaged by the driving clutch element at will.

10. The combination in a locomotive, of the frame, the axles, the track wheels thereon, the rack wheel free to rotate independently of said axle, the sliding clutch element free to rotate independently of said axle, the train of power transmitting devices interposed between the motor and the said element for driving it continuously, the clutch element connected with said sprocket wheel, the clutch element connected with said axle, and means for moving said sliding clutch element into engagement with either the rack wheel clutch element or with the axle clutch element.

11. The combination of the axle, the track wheels, the frame, the motor, the gearing driven by the motor, means for connecting the gearing to the axle, the brake and the gearing independent of the devices connected to the axle for connecting the brake to the motor shaft, substantially as set forth.

12. In a locomotive, the combination with the frame, the axles, the track wheels thereon, the motor and the train of power transmitting devices interposed between said motor and said axles, of the brake shaft having the brake drum thereon, power transmitting mechanism interposed between said brake shaft and the motor gearing, the brake pulley on said brake shaft, and the brake band arranged to engage with said pulley.

13. In a locomotive, the combination of the frame, the axles, the track wheels on the axles, the motor, the train of power transmitting devices interposed between said motor and the said axles, the brake shaft independent of said train of devices, the brake pulley thereon, the gearing connecting said shaft with the motor gearing, the brake band, and means for operating it.

14. In a locomotive, the combination of the frame, the axles, the track wheels thereon, the motor, the intermediate shaft, the gearing interposed between the motor and said shaft, the gearing connecting said intermediate shaft with one of said axles, the brake shaft, the gearing connecting the said shaft with the motor, the brake pulley, the brake band, and means for operating it.

15. In a locomotive, the combination of a frame, axles therefor, track wheels on the axles, a rack wheel mounted to revolve independently of said axles, a motor, and power transmitting mechanism interposed between said motor and said rack wheel and one of said axles and including a clutch mechanism having a continuously driven clutch element double acting to engage alternately either a clutch element arranged to drive said sprocket wheel or a clutch element arranged to drive said axle.

16. In a locomotive, the combination of a frame, axles therefor, track wheels on the axles, a sleeve loosely mounted upon one axle, a rack wheel loosely mounted on said sleeve, a clutch element carried by said rack wheel, a clutch element rigidly secured to said axle, a driving clutch element splined to said sleeve, a motor, gearing between the motor and the said sleeve, and means for shifting the said driving clutch element either into engagement with the rack wheel clutch element and out of engagement with the axle clutch element or vice versa.

17. In a locomotive, the combination of a frame, axles therefor, track wheels on the axles, a rack wheel loosely mounted on one of said axles, a clutch element carried by said rack wheel, a clutch element rigidly secured to said axle, a driving clutch element, a motor, gearing between the motor and the said driving clutch element, and means for shifting the said driving clutch element either into engagement with the rack wheel clutch element and out of engagement with the axle clutch element or vice versa.

18. In a locomotive, the combination with a frame, axles therefor, track wheels on the axles, a motor, and power transmitting mechanism interposed between said motor and one of said axles, of a brake shaft mounted independently of the motor shaft and said axles and connected with the motor shaft, and means for opposing the rotation of said brake shaft.

19. In a locomotive, the combination with a frame, axles therefor, track wheels on the axles, a motor, and power transmitting mechanism interposed between said motor and one of said axles, of a brake shaft mounted independently of the motor shaft and said axles, and connected to said motor shaft to rotate at a higher rate of speed than the said axle driven by said motor shaft, and means for opposing the rotation of said brake shaft.

20. In a locomotive, the combination of a frame, axles supporting the frame, track wheels on the axles, a sleeve on one of the axles and rotatable relative thereto, a motor, gearing between the motor and the sleeve, a rack wheel mounted on the sleeve rotatable relative thereto, and a clutch device adapted to lock the rack wheel on the sleeve and prevent relative rotary movement, substantially set forth.

21. In a locomotive, the combination of a frame, axles upon which the frame is mounted, track wheels on the axles, a sleeve mounted on one of the axles and rotatable relative thereto, a motor gearing between the motor and the sleeve, a rack wheel hub mounted on the sleeve and rotatable relative thereto, a rack wheel mounted on the hub to rotate therewith but free to move longitudinally upon the hub, and a clutch device adapted to engage the sleeve and the hub to lock them against relative angular movement, substantially as set forth.

22. In a locomotive, the combination of a frame, track wheels supporting said frame, a rack wheel supported in axial alinement with a pair of the track wheels, a motor, gearing between the motor and one of the track wheels comprising clutch mechanism, the gearing between the motor and the rack wheel comprising a second clutch mechanism and a device for operating the two mechanisms adapted to hold one of the said clutch mechanisms out of operation when the other is in operation, substantially as set forth.

23. In a locomotive, the combination of a frame, axles supporting the frame, track wheels supporting the axles, a rack wheel adapted to rotate independently of the axles, a motor, a gearing between the motor and one of the axles comprising a clutch mechanism, a gearing between the motor and the rack wheel comprising a second clutch mechanism, and operating devices for said clutch mechanisms adapted to hold one of them out of operation when the other is in operation, substantially as set forth.

24. In a locomotive, the combination of a frame, axles supporting the frame, track wheels on the axles, a rack wheel mounted on one axle and independently rotatable, a driving device rotatable on the axle, a motor gearing between the motor and the driving device whereby the said driving device may be continuously rotated, a clutch mechanism adapted to connect the driving device to the axle, a second clutch mechanism adapted to connect the said driving device to the rack wheel, and operating means for the clutch mechanism adapted to hold one or the other or both out of operation, substantially as set forth.

25. In a locomotive, the combination of a frame, track wheels and axles upon which the frame is supported, a rack wheel rotatable independently of the track wheels and axles, a continuously rotating driving device, mechanism for connecting said driving device to one of the axles, a second mechanism for connecting the said driving device to the rack wheel, and means for disconnecting one or the other or both of said mechanisms, substantially as set forth.

26. In a locomotive, the combination of a frame, track wheels supporting the frame, a rack wheel rotatable independently of the track wheels, a motor, a gearing between the motor and the said rack wheel, a brake and gearing between the motor and the brake independent of the gearing connected to the rack wheel, substantially as set forth.

27. In a locomotive, the combination of a frame, track wheels supporting the frame, a rack wheel rotatable independently of the track wheels, a motor, gearing between the motor and the rack wheel, a brake shaft additional to said gearing but connected thereto, and a brake on said brake shaft, substantialy as set forth.

28. In a locomotive, the combination of a frame, track wheels supporting the frame, a rack wheel, a motor, gearing between the motor and the track wheel comprising a clutch mechanism, gearing between the motor and the rack wheel comprising a second clutch mechanism, a brake, power transmitting devices between said brake and said motor gearing, and means for operating the said clutches to throw one or the other of them into operation, substantially as set forth.

29. The combination of a frame, axles supporting the frame, track wheels supporting the axles, a sleeve independently rotatable on one of the axles, a brake, gearing between the brake and the sleeve, a rack wheel independently rotatable on the said sleeve, and a clutch device adapted to engage the rack wheel and the sleeve and lock them against angular movement relative to one another, substantially as set forth.

30. The combination of a frame, axles supporting the frame, track wheels supporting the axles, a sleeve rotatable on one of the axles, a rack wheel hub on the sleeve and axles, rotatable relative thereto, a rack wheel on the hub and adapted to rotate therewith but free to move longitudinally thereof, a brake, gearing between the brake and the sleeve, and a clutch device adapted to lock the hub in position relative to the sleeve, substantially as set forth.

31. The combination of a frame, track wheels supporting the frame, a rack wheel rotatable independently of the track wheels, a rotatable controlling element K, a brake, gearing between the brake and the said controlling element, a clutch mechanism between the controlling element and the rack wheel, a second clutch mechanism between the controlling element and the track wheels, and clutch operating devices adapted to hold one or the other or both of the said clutch mechanisms out of operation, substantially as set forth.

32. In a locomotive, the combination of a frame, track wheels supporting the frame, a motor, a mechanism between the motor and the track wheels capable of transmitting power from the former to the latter, a rack wheel rotatable independently of the track wheels and of the said transmitting mechanism and a manually controllable means for connecting the rack wheel with the transmitting mechanism.

33. The combination with axles, track wheels and a frame supported thereby, of a rack wheel rotatable independently of the track wheels, a motor, and mechanism for operatively connecting the motor either with the track wheels independently of the rack wheels or with the rack wheels independently of the track wheels, substantially as set forth.

34. In a rack rail locomotive, the combination with axles, track wheels, and a frame supported thereby, of a rack wheel slidably mounted to permit limited movement transversely of the locomotive and a rack wheel controlling mechanism operatively connected thereto, substantially as set forth.

35. In a rack rail locomotive, the combination with axles, track wheels and a frame supported thereby, of a rack wheel, a rotatable rack wheel supporting and controlling element upon which the rack wheel is slidably mounted to permit limited movement transversely of the locomotive, and controlling mechanism operatively connected with the said rotatable controlling element, substantially as set forth.

36. In a locomotive, the combination of a frame, axles supporting the frame, track wheels on the axles, a rack wheel, a controlling element rotatable independently of the rack wheel and of the axles and track wheels, means for connecting the said element at will with the said rack wheel, means for connecting the said element at will with one of the said axles, a motor and a power connection between the motor and the said controlling element, substantially as set forth.

37. In a locomotive, the combination of a frame, axles supporting the frame, track wheels supporting the axles, a rack wheel, a rack wheel controlling element rotatable independently of the rack wheel and of the axles and track wheels, means for connecting the said element at will with the rack wheel, means for connecting the said element at will with one of the said axles, a brake and a connecting mechanism between the brake and the controlling element, substantially as set forth.

38. In a rack rail locomotive, the combination with axles, track wheels and a frame supported thereby, of a rack wheel, a controlling element rotatable independently of the rack wheel and of the axles and track wheels, means for connecting the said element at will with the rack wheel, means for connecting the said element at will with one of the said axles, a motor, a brake and connecting mechanism between the motor and brake and the said controlling element, substantially as set forth.

39. In a rack rail locomotive, the combination with axles, track wheels and a frame supported thereby, of a sleeve on one of the axles and rotatable independently thereof, a rack wheel rotatable on the sleeve, means for connecting the sleeve at will with the rack wheel, a motor, a brake and connecting mechanism between the motor and brake and the said sleeve, substantially as set forth.

40. In a locomotive, the combination with axles, track wheels and a suitable frame supported thereby, of a motor, an element rotatable independently of the axles and track wheels and adapted to be continuously driven by the motor and a clutch for connecting the said element with one of the axles, substantially as set forth.

41. In a locomotive, the combination with axles, track wheels and a suitable frame supported thereby, of a controlling element rotatable independently of the axles and track wheels, means for operatively connecting the said element with one of the said axles at will, a brake and connections between the brake and the said controlling element whereby the movement of the element is controlled by the brake, substantially as set forth.

42. In a locomotive, the combination with axles, track wheels and a frame supported thereby, of a motor, a brake, a controlling element K rotatable independently of the axles and the track wheels, power transmitting mechanism interposed between the motor and the brake on one hand and the controlling element on the other, and a means for connecting the controlling element at will with one of the axles, substantially as set forth.

43. In a locomotive, the combination with axles, track wheels and a frame supported thereby, of a sleeve on one of the axles rotatable independently thereof, means for connecting the sleeve at will with the said axle, a motor, a brake and controlling mechanism interposed between the motor and brake and the said sleeve, substantially as set forth.

In testimony whereof I affix my signature in presence of two witnesses.

FRANK L. SESSIONS.

Witnesses:
R. R. DUNLOP,
C. L. McCONKEY.

Copies of this patent may be obtained for five cents each, by addressing the "Commissioner of Patents. Washington, D. C."